United States Patent
Treharne et al.

(10) Patent No.: US 8,958,936 B2
(45) Date of Patent: *Feb. 17, 2015

(54) SYSTEM OVERRIDE FOR USER SELECTED ELECTRIC-ONLY OPERATION OF A HYBRID VEHICLE

(71) Applicant: Ford Global Technologies, LLC, Dearborn, MI (US)

(72) Inventors: William David Treharne, Ypsilanti, MI (US); Paul Stephen Bryan, Belleville, MI (US); David Crist Gabriel, Royal Oak, MI (US); Thomas Chrostowski, Chesterfield, MI (US); Scott James Thompson, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/655,800

(22) Filed: Oct. 19, 2012

(65) Prior Publication Data

US 2014/0114513 A1    Apr. 24, 2014

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .......................................................... 701/22

(58) Field of Classification Search
CPC ..... B60W 10/06; B60W 10/08; B60W 10/26; B60W 30/18; B60W 30/184; B60W 20/00; Y02T 10/6286

USPC ................. 701/22; 180/65.23, 65.265, 65.28; 903/930

See application file for complete search history.

(56) References Cited

U.S. PATENT DOCUMENTS

| | | | |
|---|---|---|---|
| 8,423,219 B2* | 4/2013 | Tofukuji et al. | 701/22 |
| 2007/0246209 A1* | 10/2007 | Lee et al. | 165/202 |
| 2009/0287366 A1* | 11/2009 | Davis et al. | 701/22 |
| 2010/0063661 A1 | 3/2010 | Saito | |
| 2010/0063662 A1 | 3/2010 | Harada et al. | |
| 2010/0087973 A1 | 4/2010 | Kaita et al. | |
| 2010/0138089 A1 | 6/2010 | James | |
| 2011/0166733 A1 | 7/2011 | Yu et al. | |
| 2011/0202210 A1 | 8/2011 | Goda | |
| 2011/0307134 A1 | 12/2011 | Yoshimi | |

(Continued)

OTHER PUBLICATIONS

Non-Final Office Action for U.S. Appl. No. 13/655,805, mailed Jul. 22, 2014, 15 pages.

*Primary Examiner* — Calvin Cheung
*Assistant Examiner* — Paula L Schneider
(74) *Attorney, Agent, or Firm* — David B. Kelley; Brooks Kushman P.C.

(57) ABSTRACT

A vehicle, a control system for a vehicle having a user interface, and a method of controlling a vehicle are provided. In response to input selecting an electric-only operating mode, an engine is disabled such that the vehicle is propelled by an electric machine. In response to detecting a predefined vehicle state while the electric-only operating mode is selected, the engine is re-enabled such that the vehicle is propelled by at least one of the engine and electric machine. In response to detecting an absence of the predefined vehicle state while the electric-only operating mode is selected, the engine is disabled such that the vehicle is propelled by the electric machine.

20 Claims, 4 Drawing Sheets

(56) References Cited

U.S. PATENT DOCUMENTS

| | | | |
|---|---|---|---|
| 2012/0123627 A1* | 5/2012 | Sourioux et al. | 701/22 |
| 2012/0187900 A1* | 7/2012 | Murawaka | 320/106 |
| 2013/0030635 A1 | 1/2013 | Morita | |
| 2013/0241519 A1* | 9/2013 | Li et al. | 323/311 |

* cited by examiner

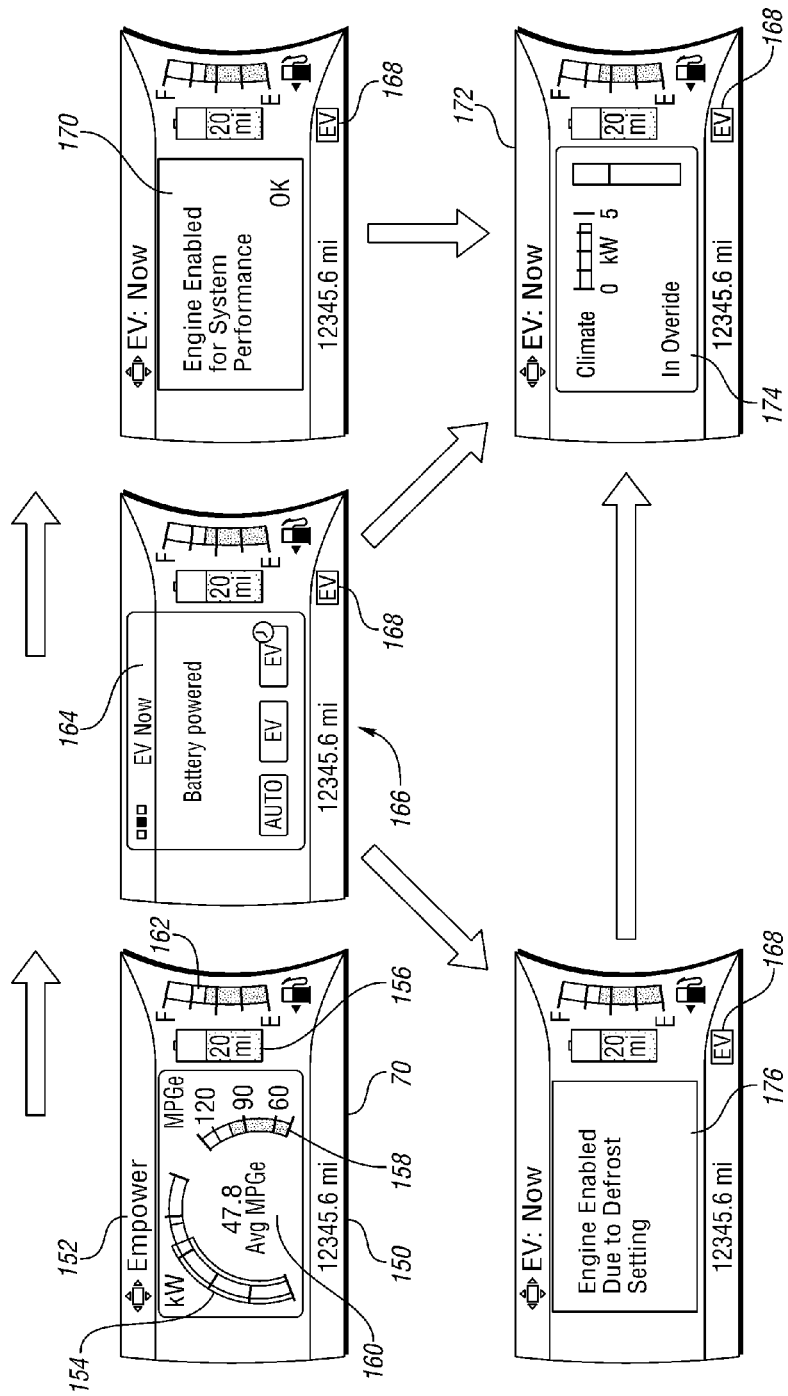

SYSTEM OVERRIDE FOR USER SELECTED ELECTRIC-ONLY OPERATION OF A HYBRID VEHICLE

TECHNICAL FIELD

Various embodiments relate to user selected electric operation of a hybrid vehicle and methods of controlling the vehicle.

BACKGROUND

A hybrid vehicle (HEV) or plug-in hybrid electric vehicle (PHEV) has more than one source of power. An electric machine may be configured to propel the vehicle and uses a battery as a source of energy. For a PHEV, the battery may be recharged using an external power source, such as a charging station. An engine may also be configured to propel the vehicle and use fuel as a source of energy.

SUMMARY

In an embodiment, a method of controlling a vehicle is provided. In response to input selecting an electric-only operating mode, an engine is disabled such that the vehicle is propelled by an electric machine. In response to detecting a predefined vehicle state while the electric-only operating mode is selected, the engine is re-enabled such that the vehicle is propelled by at least one of the engine and electric machine. In response to detecting an absence of the predefined vehicle state while the electric-only operating mode is selected, the engine is disabled such that the vehicle is propelled by the electric machine.

In another embodiment, a vehicle is provided with an electric machine configured to selectively propel the vehicle, an engine configured to selectively propel the vehicle, and a controller. The controller is configured to (i) in response to input selecting an electric-only operating mode, disable the engine and operate the electric machine to propel the vehicle; and (ii) in response to detecting a predefined vehicle state while the electric-only operating mode is selected, re-enable the engine.

In yet another embodiment, a control system for a vehicle is provided with a user interface, and a controller configured to control an engine and an electric machine and in communication with the user interface. The controller is configured to (i) in response to input selecting an electric-only operating mode, disabling an engine such that the vehicle is propelled by an electric machine, and (ii) in response to detecting a predefined vehicle state while the electric-only operating mode is selected, re-enabling the engine such that the vehicle is propelled by at least one of the engine and electric machine.

Various embodiments of the present disclosure have associated non-limiting advantages. For example, the vehicle is configured for a user selected electric only (EV) mode of operation, allowing user control and input into how the vehicle operates. The controller may override the user selected mode of operation when one of a series of vehicle states or operating conditions indicate a need for the engine to be enabled, and the vehicle to operate in a hybrid mode. The controller is configured to change the operating state of the vehicle to a hybrid mode of operation, and the hybrid mode may be dependent on the vehicle state or condition causing the override. The controller sends a message to the user via a user interface such that the user's expectations regarding vehicle operation are met and the user is informed of potential engine operation after having selected an EV mode of operation for the vehicle. The controller is configured to return the vehicle to the user selected EV mode after the vehicle state or condition that caused the EV mode override and the engine to be enabled ends. The vehicle is returned to the user selected EV mode by the controller.

BRIEF DESCRIPTION OF THE DRAWINGS

FIG. 4 is a flow chart illustrating a user interface implementing the algorithm of FIG. 3.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Plug-in hybrid electric vehicles (PHEV) utilize a larger capacity battery pack than a standard hybrid electric vehicle (HEV). PHEVs have the capability to recharge the battery from a standard electrical outlet or charging station connected to the external electric grid to reduce fuel consumption and to improve the vehicle's fuel economy. The PHEV structure is used in the figures and to describe the various embodiments below; however, it is contemplated that the various embodiments may be used with vehicles having other vehicle architectures as are known in the art. The PHEV engine may be a compression or spark ignition internal combustion engine, or an external combustion engine, and the use of various fuels is contemplated. In one example, the vehicle has the ability to connect to an external electric grid, such as in a plug-in electric hybrid vehicle (PHEV).

Besides the gasoline fuel energy, a PHEV also has an additional energy source of electrical energy stored in the battery, which may be electric energy from the electric grid deposited in the vehicle's battery during charging. The power management of the PHEV allocates the drive power demand of the vehicle to one or both of the two energy sources in order to achieve an improved fuel economy and meet the other comparable HEV/PHEV control objectives. While conventional HEVs may be operated in order to maintain the battery State of Charge (SOC) around a constant level, it may be desirable for PHEVs to use as much pre-saved battery electric (grid) energy as possible before the next charge event (when the vehicle is "plugged-in"). To increase fuel economy, the relatively inexpensive, grid-supplied electric energy may be preferentially used to save as much gasoline fuel as possible.

Figure 1:
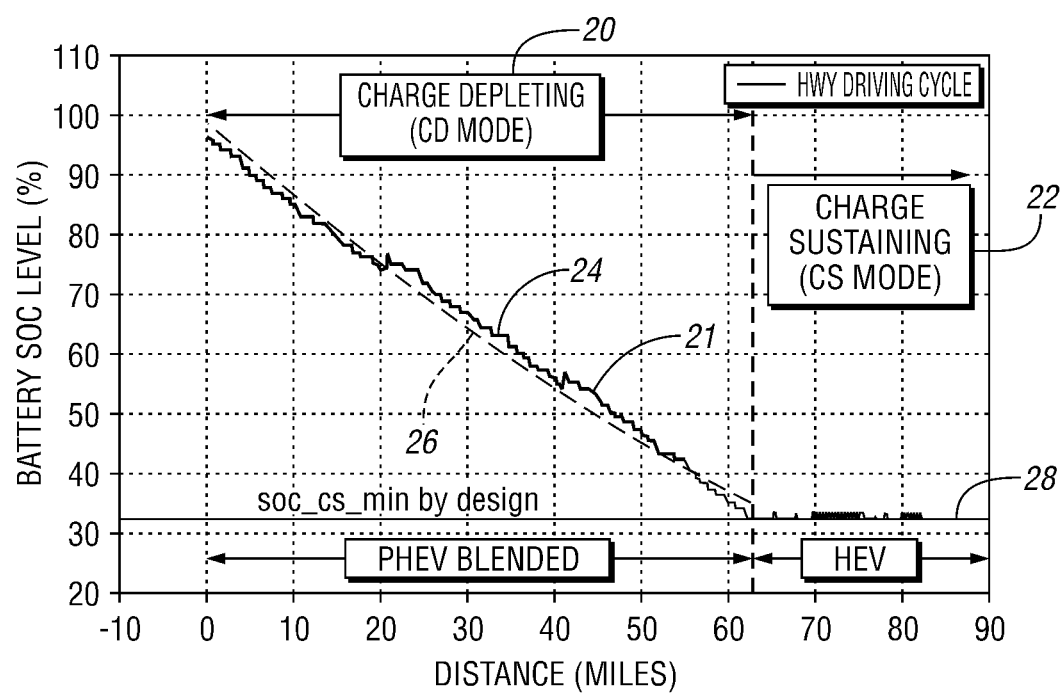
FIG. 1 is a chart illustrating two modes of operation for a plug-in electric vehicle according to an embodiment.

Generally, a PHEV has two basic operating modes as seen in FIG. 1. In a Charge Depleting (CD) mode 20 the battery electric energy 21 may be primarily used to propel the vehicle. The engine assists the vehicle drive power supply only in certain driving conditions or at excessive drive power requests during the basic charge depleting mode. One characteristic in the CD mode 20 is that the electric motor consumes more energy from the battery 21 than can be regenerated. In a Charge Sustaining (CS) mode 22 (or HEV mode), the vehicle reduces the electric motor propulsion usage to be able to keep the battery's State of Charge (SOC) 21 at a constant or approximately constant level by increasing the engine propulsion usage such that the SOC level is generally maintained.

The PHEV may operate in an Electric Vehicle (EV) mode where the electric motor is used (without help from the gasoline engine depending on PHEV strategy) for vehicle propulsion, depleting the battery up to its maximal allowable discharging rate under certain driving patterns/cycles. The EV mode is an example of a CD mode of operation for a PHEV. During an EV mode, the battery charge may increase in some circumstances, for example due to a period of regenerative braking. The engine is generally not permitted to operate under a default EV mode, but may need to be operated based on a vehicle system state or as permitted by the operator through an override or hybrid operation selection as described further below.

For the vehicle operation as shown in FIG. 1, once the battery SOC 21 decreases to a predefined charge sustaining level 28, the vehicle switches to CS mode 22, where the battery SOC 21 is kept within a vicinity of the charge sustaining SOC level, and the vehicle is primarily powered by the engine (fuel energy). The vehicle may also operate with the CD and CS modes in any order, or with CD and CS modes occurring multiple times during a key cycle. Also, the CD mode may have various battery discharging rates, or slopes. For example, the vehicle may be operated in CS mode at a battery SOC above level 28, either based on a user selection, vehicle management, or the like, and then be operated in a CD mode to use additional battery power.

In order to extend PHEV operational flexibility, the user may have the ability to select a preferred PHEV operation mode actively between electric and hybrid operation (EV/HEV) to override the automatic mode where the vehicle controller selects an operational mode for the vehicle. This permits a user to control the vehicle emissions, noise, and the like along the trip, and control the source of the power used by the vehicle, i.e. gasoline vs. electricity. For example, the user may start by requesting an HEV driving mode 28 (battery charge sustaining at a high SOC off-charge) in the initial section of the trip. This saves the battery electric energy 21 such that the user can later switch to an EV driving mode 24 at another location where EV operation of the vehicle is desirable.

When the user selects a preferred PHEV operation mode using an interface in the vehicle, such as EV/HEV buttons, the user's inputs may disrupt the normal vehicle energy management strategy. The user has the freedom to actively manage the energy usage for his/her vehicle. The more a user uses the vehicle, the better he/she can understand the vehicle energy usage property, which will lead to familiarity and better optimization that the user can exercise with the battery energy usage tool. The manual energy planning feature will not only enable the user to simply select EV/HEV driving mode, but allows the user to actively plan the battery electric energy usage and fuel usage for the trip. Although the present disclosure describes the various embodiments in terms of a PHEV, any hybrid electric vehicle having an interface permitting the user to select or control the operating mode of the vehicle may be used.

Figure 2:
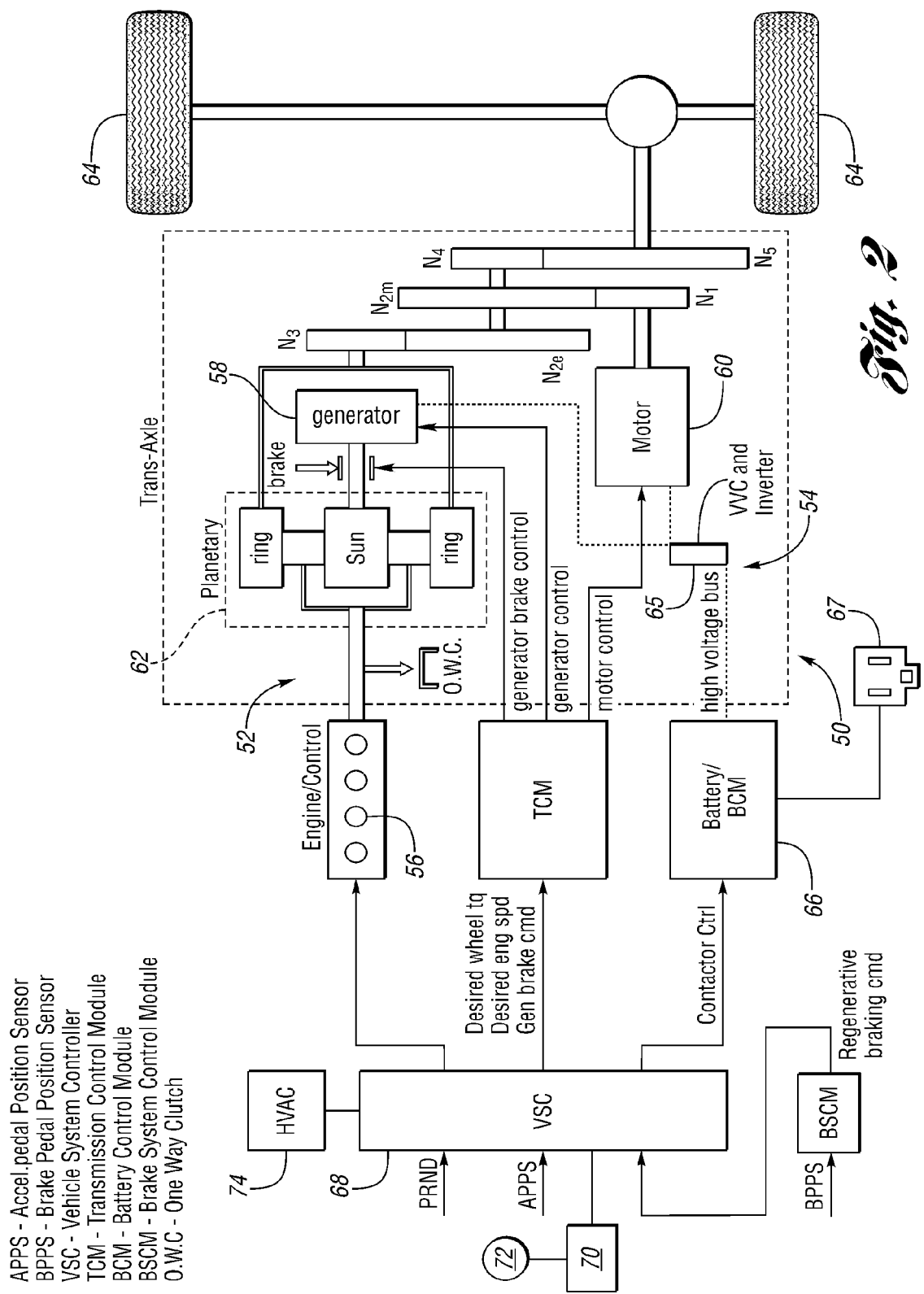
FIG. 2 is a schematic of a hybrid vehicle capable of implementing various embodiments of the present disclosure.

One example of a power split PHEV 50 capable of implementing the present disclosure is shown in FIG. 2. Of course, the PHEV 50 may be any hybrid vehicle as is known in the art that has an interface permitting the user to select or control the operating mode. FIG. 2 illustrates a power split hybrid electric vehicle 50 powertrain configuration and control system, which is a parallel hybrid electric vehicle. In this powertrain configuration, there are two power sources 52, 54 that are connected to the driveline. The first power source 52 is a combination of engine and generator subsystems using a planetary gear set to connect to each other. The second power source 54 is an electric drive system (motor, generator, and battery subsystems). The battery subsystem is an energy storage system for the generator and the motor and includes a traction battery.

During operation of the vehicle 50 using the second power source 54, the electric motor 60 draws power from the battery 66 and provides propulsion independently from the engine 56 to the vehicle 50 for forward and reverse motions. An inverter 65 may be positioned between the battery 66 and the electric machine 60 and generator 58. The inverter 65 may include a variable voltage converter as well. This operating mode is called "electric drive". In addition, the generator 58 can draw power from the battery 66 and drive against a one-way clutch coupling on the engine output shaft to propel the vehicle forward. The generator 58 can propel the vehicle forward alone when necessary.

The operation of this power split powertrain system, unlike conventional powertrain systems integrates the two power sources 52, 54 to work together seamlessly to meet the user's demand without exceeding the system's limits (such as battery limits) while optimizing the total powertrain system efficiency and performance. Coordination control between the two power sources is needed.

As shown in FIG. 2, there is a hierarchical vehicle system controller (VSC) 68 that performs the coordination control in this power split powertrain system. Under normal powertrain conditions (no subsystems/components faulted), the VSC 68 interprets the user's demands (e.g. PRND and acceleration or deceleration demand), and then determines the wheel torque command based on the user demand and powertrain limits. In addition, the VSC 68 determines when and how much torque each power source needs to provide in order to meet the user's torque demand and achieve the operating point (torque and speed) of the engine.

The VSC 68, which includes an electronic control unit (ECU), is connected to or integrated with a human-machine interface (HMI) 70, or user interface. The user interface 70 may include a user input and a display. The user input may be touch screen and/or a series of tactile buttons. The display may be a screen and/or gauges for displaying information to the user.

The control system for the vehicle 50 may include any number of controllers, and may be integrated into a single controller, or have various modules. Some or all of the controllers may be connected by a controller area network (CAN) or other system.

The engine 56 is fueled by gasoline or another fuel contained in a fuel tank 74 in fluid communication with the fuel injectors or another fuel delivery system for the engine 56. The fuel tank 74 may be refueled by a user. The fuel tank may be instrumented with a fuel sensor 76, which is configured to measure the fuel level, fuel flow to the engine, a refueling event, other fuel parameters as are known in the art. The fuel sensor 76 is in communication with the VSC 68 to provide the fuel related data or measurements to the VSC 68.

The battery 66 may be recharged or partially recharged using a charging adapter 67 connected to a charging station powered by an external power source, such as the electrical grid, a solar panel, and the like. In one embodiment, the charging adapter 67 contains an inverter and/or a transformer on-board the vehicle.

The VSC 68 may receive signals or inputs from various sources to control the vehicle. These inputs include a user selected vehicle mode and a vehicle state such as battery state, fuel level, engine temperature, oil temperature, tire pressure, and the like. Route and map information may also be provided to the VSC 68 from a navigation system, which may be incorporated into the user interface 70.

An EV button 72, or other user input of the user interface 70, provides for user selection of PHEV operation using electrical energy from the battery in an EV mode, resulting in a user selected EV mode. In the user selected EV mode, the PHEV operates in a charge depletion (CD) mode and the engine 56 may be disabled. The engine may be pulled up by the VSC 68 beyond predetermined traction battery discharge limits, speed, or other thresholds in an override of the user selected EV mode. The EV button 72 may be incorporated into the VSC 68 and the human machine interface 70 to allow the user to manually select between EV, HEV, and automatic operational modes for the vehicle. The button 72 allows the user to pre-determine and control the vehicle operation mode among EV, HEV, and automatic (VSC 68 selected) modes for a charge cycle or a key cycle.

The VSC 68 may also be in communication with a heating, ventilation, and air-conditioning system (HVAC) 74 for the vehicle. The HVAC system 74 may be in thermal communication with the engine 56, the engine coolant, the engine exhaust, an electric heater powered by the battery 66, and the like to provide heat to the passenger cabin, or to provide a defrost function for the vehicle as is known in the art.

Figure 3:
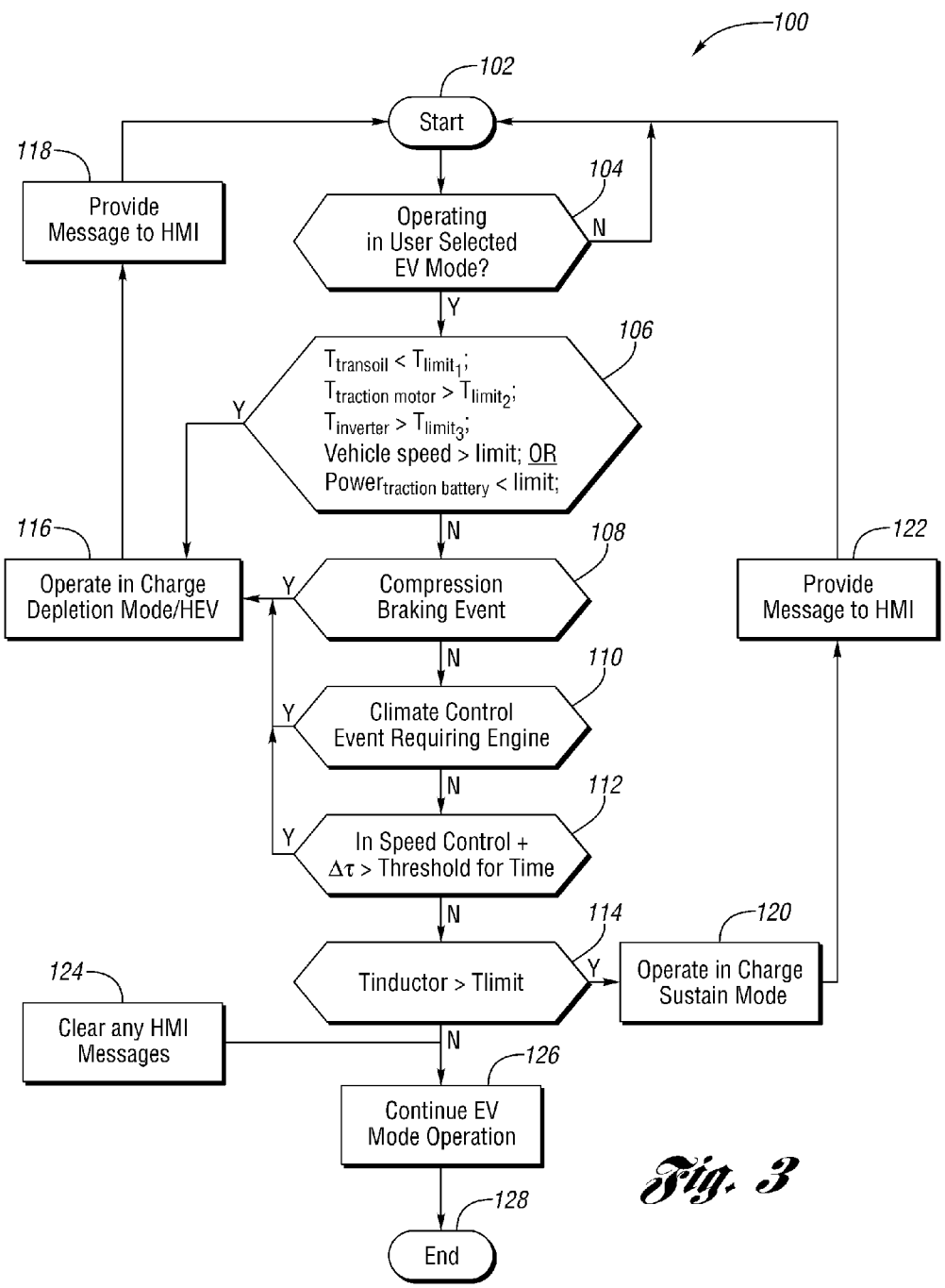
FIG. 3 is a flow chart illustrating an embodiment of an algorithm for a system override of a user selected EV mode of operation.

FIG. 3 illustrates an embodiment of an algorithm 100 for implementing a system override of the user selected EV mode. The algorithm 100 provides for a system override of the user selected EV mode of operation based on a vehicle 50 state making EV operation undesirable, or the vehicle state requiring the engine 56 to be enabled. The algorithm 100 causes the engine 56 to be enabled such that the vehicle can operate in an HEV mode temporarily when these vehicle states occur. The algorithm 100 returns to the user selected EV mode of operation when the vehicle state that caused enabling the engine 56 ceases to exist. The algorithm 100 then re-disables the engine 56 and operates the vehicle in the user selected EV mode.

The algorithm 100 begins at 102, and proceeds to 104 to determine if the vehicle 50 is operating in a user selected EV mode. For the user selected EV mode, the user has requested electric only operation using the EV input 72 through the user interface 70. The controller 68 may determine if the vehicle is operating in EV mode based on the switch input from 72, as well as other vehicle states such as the engine being disabled and the electric machine being enabled or operating. If the vehicle is not in a user selected EV mode at 104, the algorithm 100 returns to the start at 102.

If the vehicle 50 is operating in a user selected EV mode at 104, the controller 68 proceeds to determine if a vehicle state exists to cause the controller 68 to override the user selected EV mode and enable the engine 56 for operation. The vehicle states causing an override through a series of inquiries are shown in 106, 108, 110, 112, and 114 for one embodiment. Other vehicle states causing a system override of the user selected EV mode are also contemplated. In other embodiments, the controller 68 may use a greater or fewer number vehicle states than those shown in FIG. 3 to determine if an override of the EV mode is necessary.

If the vehicle is operating in a user selected EV mode at 104, the controller 68 determines if one of a series of vehicle states is above or below their respective threshold at 106, thereby triggering an override of the EV mode and enabling engine 56 operation. For example, the oil temperature of the transmission may be below a threshold value associated with EV operation of the vehicle. By enabling engine operation and running the engine, the transmission oil temperature may be increased such that the viscosity is reduced and it is in a temperature range permitting use with a transmission oil pump or an auxiliary pump. The electric machine 60 temperature may be above a temperature threshold, and by enabling the engine 56, the electric machine 60 temperature may decrease due to reduced operation of the electric machine with increased engine operation. The inverter 65 temperature may be above an associated temperature threshold. By enabling the engine 56, the inverter 65 temperature may decrease. The traction battery 66 power limit may be below as associated power limit for the battery 66 to operate in an EV mode, where enabling the engine 56 causes the total available vehicle power, i.e. from both the battery and the engine, to increase. The vehicle speed may be at or above a maximum speed associated with EV mode, such that the engine 56 needs to be enabled to meet the speed requested for the vehicle. In one embodiment, the maximum vehicle speed in an EV mode is set to eighty-five miles per hour, although other speeds may also be used as a threshold.

If the vehicle state at 106 is above or below its respective threshold such that the engine 56 needs to be enabled, i.e. vehicle speed above its threshold, transmission oil temperature below its threshold, etc., the controller 68 proceeds to 116 and enables engine operation. At 116, the engine 56 is enabled such that the vehicle operates in an HEV mode. In one embodiment, the vehicle is operated in a charge depletion (CD) mode where the engine 56 and/or the electric machine 60 are used to propel the vehicle and the state of charge of the battery is generally decreased. In other embodiments, the vehicle may be operated in a charge sustaining mode, or other hybrid mode of operation. The controller has enabled the engine 56 for operation; however, the engine 56 may not operate continually based on the operating conditions and torque requested for the vehicle. For example, the engine 56 may be enabled and not operating at 116 for various time periods, such as when the vehicle is at rest, when torque demand for the vehicle is met by the electric machine, and the like.

The controller 68 commands the display in the user interface 70 to provide a message to the user at 118. The user is informed of the system override of the user selected EV mode. The message provides information to the user to meet user expectations regarding vehicle 50 operation, prevent confusion regarding engine operation after selecting an EV mode, to provide vehicle information to the user, and the like. The algorithm 100 then returns to 102.

If the vehicle states permit EV operation of the vehicle 50 such that they are not above or below their respective thresholds at 106, the controller proceeds to 108. At 108, the controller 68 determines if there is a compression braking event requiring engine operation. A compression braking event is when the engine 56 operates based on a need or requirement for gear based torque, or negative torque output for the driveline. The gear based torque may be in a drive gear ratio, a low gear ratio, or a grade assist based gear ratio. The compression braking event may occur when the traction battery 66 state of charge is at a high state of charge or otherwise low charge limit where the electric machine 60 cannot meet the torque requirement.

If there is no compression braking event at 108, the controller 68 proceeds to 110 to determine if there is a climate control event where hybrid or engine operation needs to be enabled. The climate control request may be any climate control request based on the vehicle system architecture. For the vehicle as shown, the climate control request may be a user request for heat from the heating, ventilation, and air conditioning (HVAC) system 74 in the vehicle. The climate control request may also be a request for defrost for a windshield of the vehicle. The climate control request may also have an associated ambient temperature threshold. For example, a climate control event of a defrost request along with an ambient temperature below a threshold may lead to the engine being enabled to meet the heating needs of the HVAC system 74, as an electric heater may be unable to meet the request. Alternatively, the climate control event may be based on a lookup table providing a relationship between engine 56 coolant temperature and ambient air temperature.

If there is no climate control event at 110, the controller proceeds to 112 to determine if the engine 56 should be enabled based on a speed control setting for the vehicle. Speed control for the vehicle is when the user selects a desired constant speed for the vehicle to operate and the controller 68 automatically controls the speed of the vehicle by automatically controlling the powertrain. For example, a system override mode for speed control that enables engine operation needs to prevent loss of vehicle speed by automatically disengaging speed control because the EV mode cannot meet the speed control requirements. The speed control may be calibrateable and similar to an accelerator pedal override where the user disengages the speed control with a tip in event, or with engagement of the brake pedal. In one embodiment, speed control may be assumed for the vehicle when the demand for drive torque is higher than a threshold when the accelerator pedal position is below a threshold value. A speed control event occurs when there is a torque delta between commanded, or demanded, torque and delivered torque for more than a predetermined time period. This torque delta may be a function of vehicle speed.

If no speed control event occurs at 112, the controller 68 proceeds to 114 to compare the inductor temperature to a temperature threshold. The inductor is incorporated into the electric machine 66. If the inductor temperature is above its associated temperature threshold at 114, the controller overrides the user selected EV mode by enabling the engine for operation at 120. The controller may operate the vehicle in a charge sustaining mode at 120 such that the state of charge of the traction battery is generally maintained. The vehicle may be operated in a charge sustain mode to cool the inductor faster than in a charge depletion mode, as less power is transmitted through the inductor when the vehicle is operated in a charge sustaining mode. The controller 68 commands the display in the user interface 70 to provide a message to the user at 122. The user is informed of the system override of the user selected EV mode to meet user expectations regarding vehicle operation, prevent confusion regarding engine operation after selecting an EV mode, to provide vehicle information to the user, and the like. The algorithm 100 then returns to 102.

If the inductor temperature is below the temperature threshold at 112, the controller 68 clears any messages at 124 that were provided to the HMI from blocks 118 and 122, as the vehicle state causing the system override of the EV selected mode has ceased to exist. The controller 68 causes the vehicle to automatically return to the user selected EV mode at 126 by redisabling engine operation, and the algorithm 100 either ends at 128 or cycles back to the start at 102.

FIG. 4 illustrates an embodiment of a user interface 70 for use with the algorithm 100 and vehicle 50. The user interface 70 has a display screen 150. The screen 150 may be on the dashboard, the center console, incorporated into the vehicle gauge system, or the like. Of course, the screens as shown in FIG. 4, including any icons and messages, are according to an embodiment. Other embodiments may include other screen layouts, designs, and messages regarding the disclosure. The user interface has a general screen as shown at 152. The general screen 152 may be displayed during typical vehicle operation, and may include such information as the power available from the traction battery 154, mileage available in EV mode 156, the instantaneous or short term fuel economy 158, the average or long term fuel economy 160, and a fuel tank level gauge 162.

When the user activates a switch 72 to select and change the mode of operation of the vehicle to a user selected EV mode, a pop-up or message 164 appears on the screen 150, as shown by screenshot 166. In the embodiment shown, the user may select from automatic VSC operation of the vehicle, a user selected EV mode, and a delayed user selected EV mode where the vehicle may be operated in an HEV mode. When the EV mode is selected, an EV indicator light 168 may appear on the screen 150 to inform the user that the vehicle is operating in the EV mode. In some embodiments, the message 164 may clear from the screen 150 after a specified time period, and revert to a general screen display 152 with the addition of the EV indicator 168.

When the engine 56 is enabled by the algorithm 100, the user selected EV mode is overridden. When the algorithm 100 enables the engine due to a vehicle state compared to a threshold 106, a compression braking event 108, a speed control event 112, or an inductor temperature 114, the algorithm 100 causes a popup or message 170 to be displayed on the screen from step 118 or 122. The message informs the user that the engine 56 has been enabled. When the user acknowledges the message 170, or after expiration of a suitable time period, the algorithm 100 changes the screen 150 to a general override screen at 172. The override screen 172 may have an indicator light or message 174 that continues to inform the user of the override of the EV mode and that engine 56 is enabled and may be operating. The message may be general, or may be specific as to the cause of the override.

When the algorithm 100 enables the engine 50 due to a climate control event 110, algorithm 100 causes a popup or message 176 to be displayed on the screen from step 118. The message informs the user that the engine has been enabled, and may include the cause of the override, such as a defrost or heat setting in the HVAC. When the user acknowledges the message 176, or after expiration of a suitable time period, the algorithm 100 changes the screen 150 to a general override screen at 172. The override screen 172 may have an indicator light or message 174 that continues to inform the user of the override of the EV mode and that that engine is enabled and may be operating.

When the condition causing the controller override of EV mode ends such that the engine 56 no longer needs to be enabled, the screen 150 may be changed back to a general operating screen 152 with the addition of an EV indicator light 168 present. The controller 68 re-disables the engine 56 and returns the vehicle to operating in the user selected mode.

As such, various embodiments according to the present disclosure provide associated non-limiting advantages. For example, the vehicle is configured for a user selected EV mode of operation, allowing user control and input into how the vehicle operates. The controller may override the user selected mode of operation when one of a series of vehicle states or operating conditions indicate a need for the engine to be enabled, and the vehicle to operate in a hybrid mode. The controller is configured to change the operating state of the vehicle to a hybrid mode of operation, and the hybrid mode may be dependent on the vehicle state or condition causing the override. The controller sends a message to the user via a user interface such that the user's expectations regarding vehicle operation are met and the user is informed of potential engine operation after having selected an EV mode of operation for the vehicle. The controller is configured to return the vehicle to the user selected EV mode after the vehicle state or condition that caused the EV mode override and the engine to be enabled ends. The vehicle is returned to the user selected EV mode by the controller.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A method of controlling a vehicle comprising:
   in response to user input selecting an electric-only operating mode, disabling an engine via a controller such that the vehicle is propelled by an electric machine;
   in response to detecting a predefined vehicle state while the electric-only operating mode is selected, re-enabling the engine via the controller such that the vehicle is propelled by at least one of the engine and electric machine and the engine and electric machine are operated such that a state of charge of a traction battery is generally maintained or decreases; and
   in response to detecting an absence of the predefined vehicle state while the electric-only operating mode is selected, disabling the engine via the controller such that the vehicle is propelled by the electric machine.

2. The method of claim 1 wherein the predefined vehicle state is temperature of an inductor being greater than a threshold temperature.

3. The method of claim 1 further comprising displaying a message on a user interface confirming selection of the electric-only operating mode; and
   displaying another message on the user interface regarding re-enabling the engine while the electric-only operating mode is selected.

4. A vehicle comprising:
   an electric machine and an engine, each configured to selectively propel the vehicle; and
   a controller configured to (i) in response to user input selecting an electric-only operating mode, disable the engine and operate the electric machine to propel the vehicle; and (ii) in response to detecting a predefined vehicle state while the electric-only operating mode is selected, re-enable the engine to propel the vehicle without increasing a battery state of charge.

5. The vehicle of claim 4, wherein the controller is further configured to, in response to detecting an absence of the predefined vehicle state while the electric-only operating mode is selected, disable the engine such that the vehicle is propelled by the electric machine.

6. The vehicle of claim 4 further comprising a traction battery wherein the controller is further configured to operate at least one of the engine and electric machine while the engine is re-enabled such that state of charge of the traction battery generally decreases.

7. The vehicle of claim 4 further comprising a traction battery wherein the predefined vehicle state is a state of charge of the traction battery being less than a threshold state of charge.

8. The vehicle of claim 4 further comprising:
   a traction battery; and
   an inductor electrically connected to the traction battery;
   wherein the predefined vehicle state is temperature of the inductor being greater than a threshold temperature; and
   wherein the controller is further configured to operate the electric machine and engine while the engine is re-enabled such that a state of charge of the traction battery is generally maintained to reduce the inductor temperature.

9. The vehicle of claim 4 wherein the predefined vehicle state is a vehicle torque demand that exceeds available electric machine torque for a predetermined time period when speed control is active.

10. The vehicle of claim 4 wherein the predefined vehicle state is a vehicle speed being greater than a maximum electric-only vehicle speed.

11. The vehicle of claim 4 wherein the predefined vehicle state is a negative torque demand on the vehicle requiring engine braking.

12. The vehicle of claim 4 further comprising a climate control system for a passenger cabin of the vehicle;
    wherein the predefined vehicle state is a predefined climate control event.

13. The vehicle of claim 12 wherein the predefined climate control event is a heat demand by a user exceeding a threshold heat demand.

14. The vehicle of claim 4 further comprising a user interface;
    wherein the controller is further configured to display a message on a user interface confirming selection of the electric-only operating mode, and display another message on the user interface regarding re-enabling the engine while the electric-only operating mode is selected.

15. A control system for a vehicle comprising:
    a user interface; and
    a controller configured to control an engine and an electric machine and in communication with the user interface, the controller configured to (i) in response to input selecting an electric-only operating mode, disabling an engine such that the vehicle is propelled by an electric machine, and (ii) in response to detecting a predefined vehicle state while the electric-only operating mode is selected, re-enabling the engine such that the vehicle is propelled by a combination of the engine and electric machine.

16. The control system of claim 15 wherein the user interface has a display screen.

17. The control system of claim 16 wherein the controller is further configured to command the display screen to display a message confirming electric-only operation in response to input selecting an electric-only operating mode.

18. The control system of claim 16 wherein the controller is further configured to command the display screen to display a message regarding re-enabling the engine in response to detecting a predefined vehicle state while the electric-only operating mode is selected.

19. The control system of claim 15 wherein the controller is further configured to, in response to detecting the predefined vehicle state while the electric-only operating mode is selected, re-enabling the engine such that the vehicle is propelled by the combination of the engine and electric machine and the vehicle is operated in a charge depletion mode.

20. The control system of claim 19 wherein the controller is further configured to, in response to detecting another predefined vehicle state while the electric-only operating mode is selected, re-enabling the engine such that the vehicle is propelled by a combination of the engine and electric machine and the vehicle is operated in a charge sustain mode.

* * * * *